United States Patent

[11] 3,581,493

| [72] | Inventors | Ervin J. Sweet<br>Trumbull;<br>Paul A. Avery, Shelton, both of, Conn. |
|---|---|---|
| [21] | Appl. No. | 884,561 |
| [22] | Filed | Dec. 12, 1969 |
| [45] | Patented | June 1, 1971 |
| [73] | Assignee | Avco Corporation<br>Stratford, Conn. |

[54] AIR ASSIST FOR FUEL INJECTOR
3 Claims, 5 Drawing Figs.

[52] U.S. Cl. .................................................. 60/39.74,
60/39.23, 60/39.29, 60/39
[51] Int. Cl. ................................................. F02c 9/14
[50] Field of Search .......................................... 60/39.74,
39.65, 39.23, 39.29

[56] References Cited
UNITED STATES PATENTS

| 2,595,759 | 5/1952 | Buckland | 60/39.74 |
| 2,635,425 | 4/1953 | Thorpe | 60/39.74 |
| 2,807,933 | 10/1957 | Martin | 60/39.65 |
| 3,048,014 | 8/1962 | Schmidt | 60/39.74 |

*Primary Examiner*—Douglas Hart
*Attorneys*—Charles M. Hogan and Gary M. Gron

ABSTRACT: An air assist device for maintaining a constant pressure drop at the point of fuel injection for air supplied to the combustor over the speed range of a gas turbine compressor, the air assist pump being connected between the engine compressor and the fuel injector with the rate of rotation of the pump varied in response to variations in fuel manifold pressure by means of a toroidal type transmission the drive for which is varied to compensate for changes in the manifold pressure thereby varying the speed of rotation of the pump to assist in maintaining the pressure of the air to the fuel injector over the speed range of the engine.

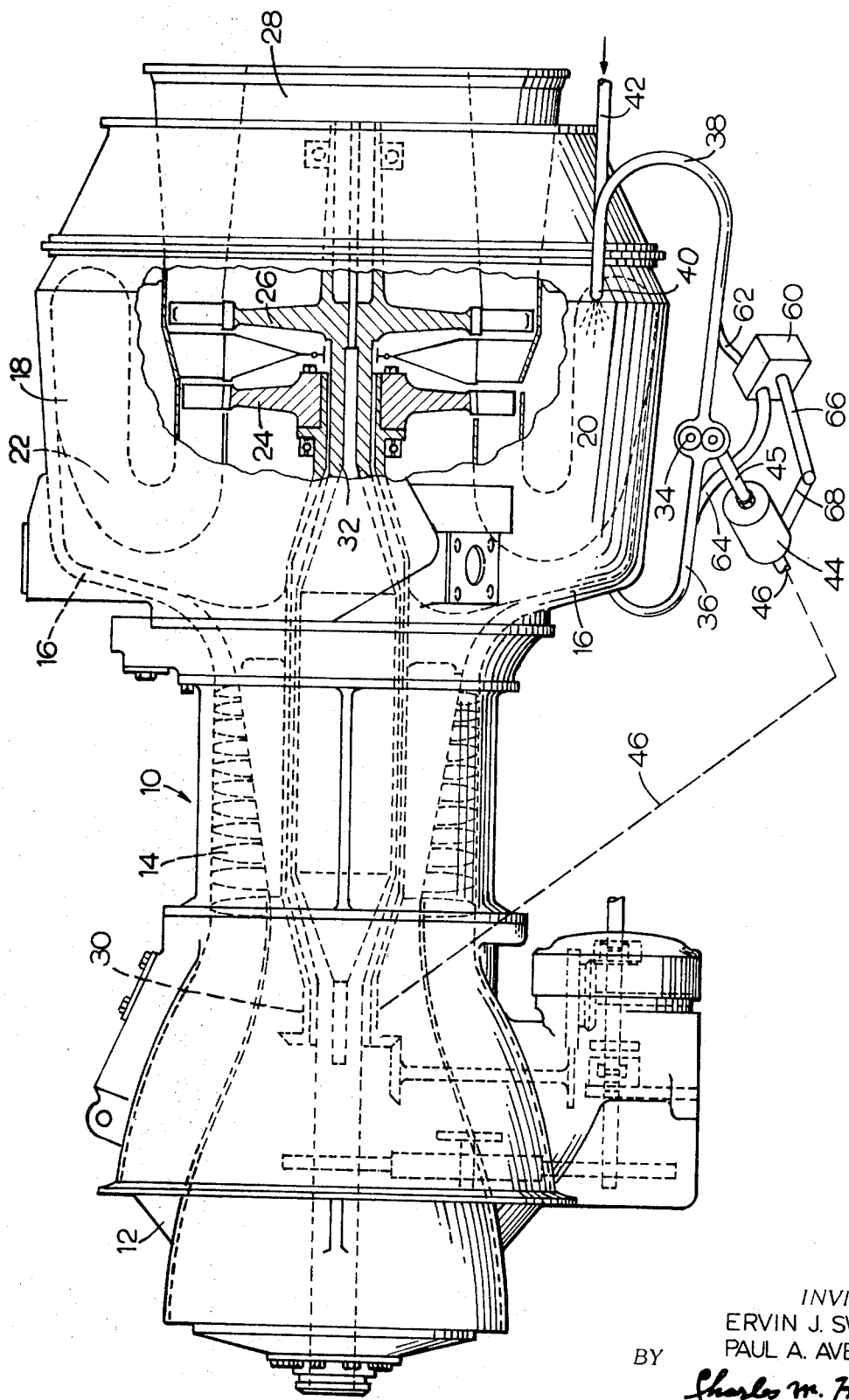

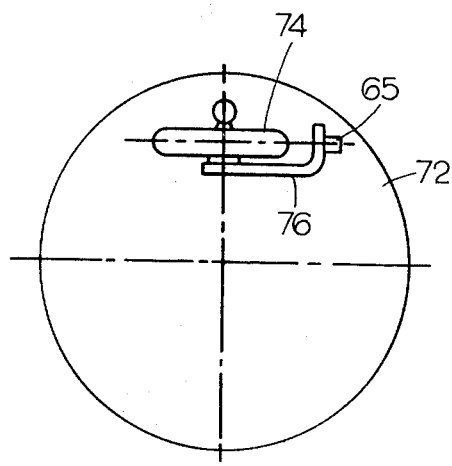
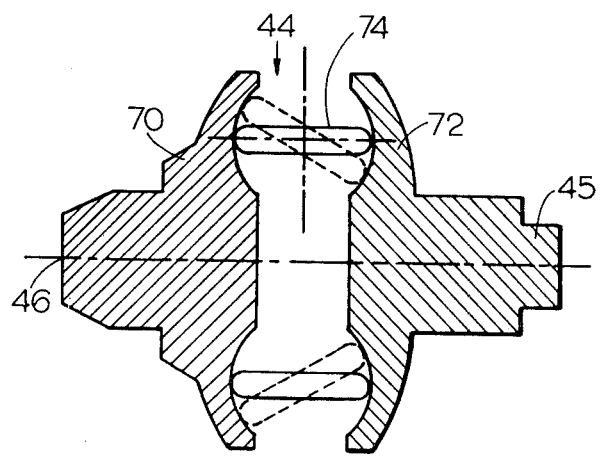
FIG. 4    FIG. 3
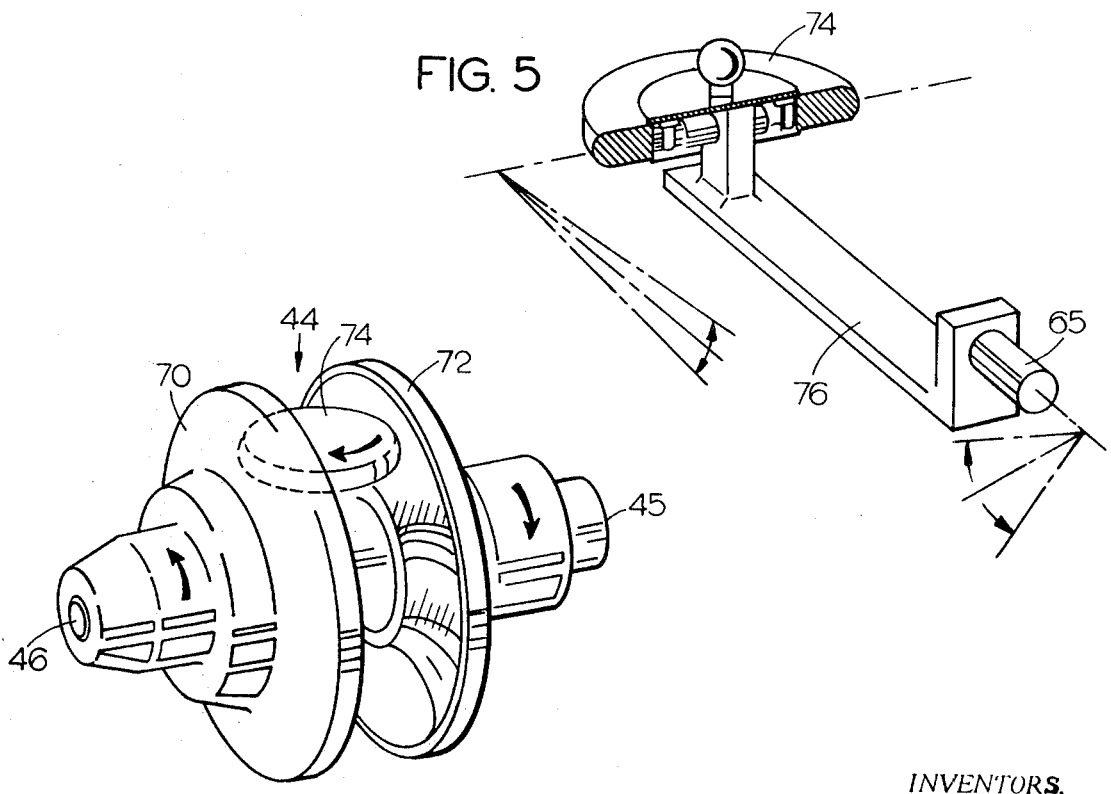
FIG. 5
FIG. 2
INVENTORS.
ERVIN J. SWEET
PAUL A. AVERY
BY Charles M. Hogan
Gary M. Gron
ATTORNEYS

AIR ASSIST FOR FUEL INJECTOR

BACKGROUND OF THE INVENTION

In gas turbine engines and other devices which burn liquid fuel and which employ an injector which is intended to atomize the fuel at the point of injection by providing air at the nozzle to mix with the fuel, all require sufficient air over a relatively wide variation in speed. The engine compressor or other devices commonly relied upon have substantially the same speed variation as the engine. The provision of sufficient air at required pressures is particularly important for good atomization when thick or contaminated fuel may be a possibility during operation. In the case of a gas turbine engine, the engine speed variation may be considerable from starting speeds over a range in which the engine may operate and improvement would result with an air supply constant in pressure.

SUMMARY

In order to compensate for variations in air supply to a fuel injector furnished by a compressor rotating at engine shaft speed, an air assist pump is employed which compensates for compressor speed variation to give a more constant air pressure over the speed range. This pump is positioned in an auxiliary air line from the compressor to the fuel injector where fuel and air are mixed before entering the engine combustion section. A variable speed drive transmission, having a control for varying the drive ratio from the engine shaft to the shaft of the pump is responsive to variations in pressure in the air supply line from the pump to the injector and is so constructed and arranged as to vary the speed of rotation of the pump to compensate for variations over the speed range of the engine.

It is a primary object of the present invention to provide an air assist pump to maintain the pressure of air to the fuel injector of a gas turbine engine with lesser variation in pressure over the speed range of the engine by the use of the variable drive transmission to change the range of rotation of the pump in amount controlled by variation in pressure in a conduit between the pump and the fuel injector.

It is a further object to provide an air assist pump positioned in a conduit between the outlet of the engine compressor and the fuel injector controlled in output by varying the drive ratio to the pump in response to variation in pressure in the air conduit between the pump outlet and the fuel injector such variation being accomplished by a variable speed transmission of the toroidal type the variation in drive ratio of which is controlled by steerable rollers responsive to variation in pressure in said conduit.

The above and other objects of the invention will appear more fully from the following more detailed description and by reference to the accompanying drawings forming a part hereof.

DRAWINGS

FIG. 1 is a showing of a gas turbine engine in side view, partly in section, with a showing partially diagrammatic, of the arrangement of an air assist pump driven from an engine rotative member through a variable speed drive, so-called VSD. The pump is connected between the outlet of the engine compressor and the fuel injector, which feeds fuel to the combustor of the engine. The location of the pump and its drive relative to other parts of the engine are shown.

FIGS. 2, 3, 4, and 5 are views showing the toroidal transmission and the component parts thereof.

DESCRIPTIONS OF ILLUSTRATIVE STRUCTURES

Referring to the drawings FIG. 1 shows the Air Assist device attached to a gas turbine engine. This engine is of the general construction as disclosed in U.S. Pat. No. 3,019,606. As shown in FIG. 1 the gas turbine engine 10 has an air inlet 12 near the front of the engine which provides for inlet of air to a compressor 14 and a radial diffuser 16 and an annular combustor 18 from which the air thus compressed by the compressor 14 is fed into a combustion chamber 20 where it is mixed with fuel and ignited and the resulting gases are directed through suitable annular passages 22 first against the gas producer turbine 24 and subsequently in a second stage into a second or power turbine 26, and with subsequent ejection at the rear of the engine through the outlet 28. The gas producer turbine 24 drives the compressor 14 through a gas producer turbine shaft 30 and the power turbine 26 drives a power turbine shaft 32 which is enclosed within, but independently rotatable relative to the gas producer turbine shaft 30.

The diagrammatic showing of the air assist device is shown in FIG. 1 attached to the engine with air assist, pump 34 positioned in an auxiliary air passage connection 36 which receives air from the outlet region of the engine compressor 14 and feeds this air in the direction from the outlet region of the compressor to the pump 34 and continues in an air passage 38 in such direction as to connect with the fuel injector 40 which is of a type known in the art to mix air and fuel and to feed it into the combustion section 20 of the engine. The fuel is fed to the injector by the tube 42.

The pump 34 is therefore designed to take air at the compressor outlet pressure and to assist movement of such air and to increase the pressure thereof, by a fixed amount, and to supply it to the fuel injector 40 as an air assist to injection and atomization. The pressure increase accomplished by this pump 34 is dependent upon its rate of rotation.

The r.p.m. of the pump 34 is controlled by a variable speed drive 44, later described in more detail hereinafter with reference to FIGS. 2, 3, 4 and 5. The variable speed drive 44 is connected between the drive shaft 46 from the engine shaft 30 and the drive shaft 45 of the pump 34. This variable speed drive 44 is shown in cross section diagram FIG. 3 and perspective FIG. 2, and it has a control 60 shown in FIG. 1 which produces an actuating force responsive to the pressure drop across pump 34 by pressure connections 62, 64 on opposite sides of the pump, so that the pressure drop is translated into a control force through connections 66, 68 which connections as shown in the diagram of FIG. 1 change the steering angle of the drive rollers of the variable speed drive 44 to increase or decrease the drive ratio, and therefore the pump rate of rotation, in response to pressure change in passage 38 adjacent injector 40. Therefore, the pressure drop is maintained at a more constant level since on variation in compressor rate of rotation the pressure responsive element 60, in the structure illustrated, will cause the drive ratio of transmission 44 to be changed thru actuators and connections 60, 66, 68.

The toroidal variable speed drive 44 is of the general type shown in U.S. Pat. No. 2,962,909. FIG. 2 shows that this so-called toroidal type of transmission employs annular grooves of semicircular cross section formed in the opposite faces of opposed toroid discs 70, 72. The interposed friction wheels or rollers 74 are steerable to vary the so-called steer angle thereby to make contact in different angular positions between the two opposed toroidal grooves to vary the drive ratio between discs. The amount of pressure necessary to cause the steer angle to be changed to vary the drive ratio is a very small force. Therefore, this toroidal transmission is a type of control particularly adaptable to operate with a mechanism such as the small force type of control 60 responsive to the relatively small pressure variations in the conduit connections 36, 38.

The perspective drawing of the toroidal-type transmission 44 is shown in FIG. 2 where the previously mentioned input toroid 70 spaced from and facing the output toroid 72 employs steerable rollers 74 for drive from input to output. Generally at least three of these rollers 74 are spaced in a peripheral location as shown in FIGS. 2 and 3 so that the driving contact is made by the rollers between the toroid members 70 and 72, the drive being accomplished by frictional contact of the rollers 74 on the facing toroid members 70, 72 and the variation in drive ratio being accomplished by the angular setting of the rollers 74 relative to the toroid members as shown best in FIG. 3, where it appears that the angle of the rollers determine the relative radius of contact of the rollers to determine drive ratio. As an illustration, shown in FIG. 3, the full line position of the rollers would have a 1 to 1 drive ratio inasmuch as the same radius of contact is accomplished on both members 70 and 72 while in the dotted showing the rollers 74 have been changed in angle by the steering mechanism so that there is a greater radius of contact on the toroid 70 than on the toroid 72 and, therefore, there is a drive providing an increase in speed for the member 72 over member 70 because of the difference in relative radius of contact. The means for accomplishing this change is shown in FIGS. 4 and 5 where a steering connection 76 is shown which, with a relatively small amount of force thru connection 65 from connections 66, 68. These members 66, 68 are shown in FIG. 1, where the connections from control 60, responsive to the 62, 64, pressure drop across the pump, 34 are shown. Thus, the variable speed drive 44 causes steer angle of rollers 74 to be changed to vary drive ratio in response to variation in pressure drop across the pump 34, and there to maintain a more nearly constant pressure in air passage 38 and at fuel injector 40.

The toroidal type of transmission with its opposed toroids and drive rollers therebetween is particularly suited to the combination herein described in that the variation in drive ratio can be accomplished by very small forces generated by the control elements of the combination. Furthermore, the toroidal type of transmission by its compact construction and light weight is also available to be assembled in the combination of mechanism in a very advantageous manner.

The invention has been described by reference to a specific structure found practical in actual operation but modifications are intended within the scope of the following claims.

We claim:

1. In a mechanism for supplying an air fuel mixture into a combustor of an engine having an air compressor and a fuel injector;
   an air conduit between the outlet region of the air compressor and the fuel injector;
   an air pump positioned in said conduit to receive air from said air compressor;
   a drive for rotating said pump from said engine;
   a transmission for varying the drive ratio from said engine to said pump;
   mechanism to vary the drive ratio of said transmission responsive to variation in pressure in the air conduit between the pump air outlet and the fuel injector in amount to reduce variation in pressure of air supplied to said injector over the operable speed range of said engine.

2. An air assist device for improving the air flow into the fuel injector of an gas turbine engine having a fuel injector and an engine driven air compressor normally operating with variation resulting over the engine speed range comprising;
   a pump positioned to receive air from an outlet region of the engine driven compressor;
   means to control the speed of rotation of said pump including a toroidal type variable speed drive between a shaft of said engine and the drive shaft of said pump;
   connections to vary the effective drive ratio of said variable speed drive controlled by the variation in pressure of the air flow adjacent said fuel injector thereby to maintain pressure of air supplied to said injector with a lesser variation over the speed range of said engine than is accomplished by said compressor.

3. An air assist device for maintaining a more nearly constant pressure of air supplied to a fuel injector for an engine in which the primary air supply is provided by a compressor operating at the engine shaft speed and subject to speed variations over the speed range of said engine;
   said device comprising:
   an air conduit between the outlet of the compressor and the fuel injector;
   an air assist pump positioned in said conduit;
   a pump shaft the speed of rotation of which is a function of the air pressure generated by said pump;
   a transmission mechanism having an input shaft driven at an engine shaft speed and an output shaft connected to rotate the pump shaft;
   a variable speed toroidal drive connection in said transmission mechanism between said input shaft and said output shaft;
   said toroidal drive connection having opposed toroidal discs one rotating with said input shaft and the other rotating with said output shaft;
   steerable drive rollers between said opposing toroidal discs thereby to effect change in drive ratio of said transmission;
   an actuator responsive to pressure in the conduit connection between the output of the air assist pump and the injector, said actuator constructed to vary the drive ratio of said transmission in response to variation in pressure in said conduit connection;
   a steering connection between said drive rollers and said actuator connected to change the steer angle of said rollers in direction and amount so that the variation in pressure and volume of air supplied over the speed range of said engine by said pump to said fuel injector will be reduced as compared with variation accomplished by said engine compressor.